(12) United States Patent
Takatori et al.

(10) Patent No.: US 7,869,430 B2
(45) Date of Patent: Jan. 11, 2011

(54) COMMUNICATION TERMINAL DEVICE AND BILLING DEVICE

(76) Inventors: Sunao Takatori, c/o Yozan Inc., 3-5-18, Kitazawa, Setagaya-ku, Tokyo (JP); Hisanori Kiyomatsu, c/o Yozan Inc., 3-5-18, Kitazawa, Setagaya-ku, Tokyo (JP)

( * ) Notice: Subject to any disclaimer, the term of this patent is extended or adjusted under 35 U.S.C. 154(b) by 327 days.

(21) Appl. No.: 11/696,498

(22) Filed: Apr. 4, 2007

(65) Prior Publication Data
US 2007/0244814 A1   Oct. 18, 2007

Related U.S. Application Data
(63) Continuation of application No. 10/054,038, filed on Nov. 12, 2001.

(30) Foreign Application Priority Data
Nov. 13, 2000   (JP)   ............... 2000-344671

(51) Int. Cl.
*H04L 12/28* (2006.01)
*H04L 12/56* (2006.01)
*G06F 15/173* (2006.01)

(52) U.S. Cl. .................. 370/389; 370/235; 370/259; 370/398; 370/401; 370/426; 705/30; 705/43; 705/76; 705/78; 709/223

(58) Field of Classification Search ......... 370/229–463; 705/30–34, 40–43, 76–78
See application file for complete search history.

(56) References Cited

U.S. PATENT DOCUMENTS

| | | | |
|---|---|---|---|
| 4,691,314 A | 9/1987 | Bergins et al. | |
| 4,839,891 A | 6/1989 | Kobayashi et al. | |
| 4,890,321 A | 12/1989 | Seth-Smith et al. | |
| 4,977,582 A | 12/1990 | Nichols et al. | |
| 5,166,926 A | * 11/1992 | Cisneros et al. | ............ 370/392 |

(Continued)

FOREIGN PATENT DOCUMENTS

JP   63-131635   6/1988

(Continued)

OTHER PUBLICATIONS

Advisory Action Before the Mailing of an Appeal Brief for U.S. Appl. No. 10/054,038, mailed on Jan. 23, 2008.

(Continued)

*Primary Examiner*—Ayaz R Sheikh
*Assistant Examiner*—Venkatesh Haliyur
(74) *Attorney, Agent, or Firm*—Sterne, Kessler, Goldstein & Fox P.L.L.C.

(57) ABSTRACT

For transmitting transmission data generated by a transmission data generator of a communication terminal device, a packet unit determining unit determines a packet unit for a lowest data communication rate for the transmission of the transmission data, among packet units (packet sizes) that can be recognized by a destination communication terminal device and that can be transmitted from the communication terminal device. A packet generator packetizes the transmission data according to the packet unit determined by the packet unit determining unit, and transmits the packetized transmission data to the destination communication terminal device.

14 Claims, 3 Drawing Sheets

U.S. PATENT DOCUMENTS

| | | | | |
|---|---|---|---|---|
| 5,166,930 | A * | 11/1992 | Braff et al. | 370/235 |
| 5,197,002 | A * | 3/1993 | Spencer | 705/34 |
| 5,390,175 | A * | 2/1995 | Hiller et al. | 370/398 |
| 5,404,374 | A | 4/1995 | Mullins et al. | |
| 5,600,643 | A * | 2/1997 | Robrock, II | 370/399 |
| 5,638,431 | A * | 6/1997 | Everett et al. | 379/114.28 |
| 5,790,173 | A | 8/1998 | Strauss et al. | |
| 5,870,724 | A * | 2/1999 | Lawlor et al. | 705/42 |
| 5,892,535 | A * | 4/1999 | Allen et al. | 725/36 |
| 5,892,753 | A | 4/1999 | Badt et al. | |
| 6,085,253 | A * | 7/2000 | Blackwell et al. | 709/235 |
| 6,094,423 | A * | 7/2000 | Alfano et al. | 370/310 |
| 6,130,898 | A * | 10/2000 | Kostreski et al. | 370/522 |
| 6,134,243 | A | 10/2000 | Jones et al. | |
| 6,137,869 | A * | 10/2000 | Voit et al. | 379/114.01 |
| 6,230,144 | B1 * | 5/2001 | Kilkki et al. | 705/30 |
| 6,230,190 | B1 | 5/2001 | Edmonds et al. | |
| 6,240,091 | B1 * | 5/2001 | Ginzboorg et al. | 370/401 |
| 6,243,676 | B1 | 6/2001 | Witteman | |
| 6,282,274 | B1 * | 8/2001 | Jain et al. | 379/114.26 |
| 6,285,991 | B1 * | 9/2001 | Powar | 705/76 |
| 6,301,621 | B1 | 10/2001 | Haverstock et al. | |
| 6,351,467 | B1 * | 2/2002 | Dillon | 370/432 |
| 6,356,937 | B1 | 3/2002 | Montville et al. | |
| 6,397,055 | B1 | 5/2002 | McHenry et al. | |
| 6,397,345 | B1 | 5/2002 | Edmonds et al. | |
| 6,412,079 | B1 | 6/2002 | Edmonds et al. | |
| 6,512,761 | B1 * | 1/2003 | Schuster et al. | 370/352 |
| 6,522,628 | B1 | 2/2003 | Patel et al. | |
| 6,546,238 | B1 | 4/2003 | Nightingale et al. | |
| 6,556,818 | B1 | 4/2003 | Meehan | |
| 6,570,855 | B1 * | 5/2003 | Kung et al. | 370/237 |
| 6,574,213 | B1 | 6/2003 | Anandakumar et al. | |
| 6,728,263 | B2 | 4/2004 | Joy et al. | |
| 6,768,722 | B1 * | 7/2004 | Katseff et al. | 370/260 |
| 6,839,322 | B1 | 1/2005 | Ashwood Smith | |
| 6,888,796 | B2 | 5/2005 | Iizuka | |
| 6,957,255 | B1 * | 10/2005 | Schweitzer et al. | 709/223 |
| 6,965,943 | B1 * | 11/2005 | Golestani | 709/235 |
| 7,012,893 | B2 | 3/2006 | Bahadiroglu | |
| 7,035,916 | B1 | 4/2006 | Backman et al. | |
| 7,194,554 | B1 | 3/2007 | Short et al. | |
| 7,243,160 | B2 | 7/2007 | Brahmaroutu | |
| 7,369,498 | B1 | 5/2008 | Ma et al. | |
| 2002/0077981 | A1 * | 6/2002 | Takatori et al. | 705/40 |
| 2002/0099632 | A1 * | 7/2002 | Yanagidate et al. | 705/34 |
| 2003/0091031 | A1 * | 5/2003 | Kuhlmann et al. | 370/352 |
| 2003/0093341 | A1 * | 5/2003 | Millard et al. | 705/34 |

FOREIGN PATENT DOCUMENTS

| | | |
|---|---|---|
| JP | H09-055718 | 2/1997 |
| JP | 2000-209200 | 7/2000 |

OTHER PUBLICATIONS

Final Office Action for U.S. Appl. No. 10/054,038, mailed on Oct. 9, 2007.

Non-Final Office Action for U.S. Appl. 10/054,038, mailed on Apr. 18, 2007.

Non-Final Office Action for U.S. Appl. No. 10/054,038, mailed on Oct. 4, 2006.

Non-Final Office Action, mailed Feb. 25, 2009, for U.S. Appl. No. 10/054,038, filed Nov. 12, 2001, 17 pgs.

Non-Final Office Action, mailed May 2, 2008, for U.S. Appl. No. 10/054,038, filed Nov. 12, 2001, 10 pgs.

Final Office Action, mailed Nov. 25, 2008, for U.S. Appl. No. 10/054,038, filed Nov. 12, 2001, 21 pgs.

English language abstract of Japanese Patent Publication No. 63-131635, titled "LAN Control Equipment," 1 pg, dated Jun. 3, 1988.

English language abstract of Japanese Patent Publication No. H09-055718, titled "Data Communication Device," 1 pg, dated Feb. 25, 1997.

English language abstract of Japanese Patent Publication No. 2000-209200, titled "Packet Charging System," 1 pg, dated Jul. 28, 2000.

* cited by examiner

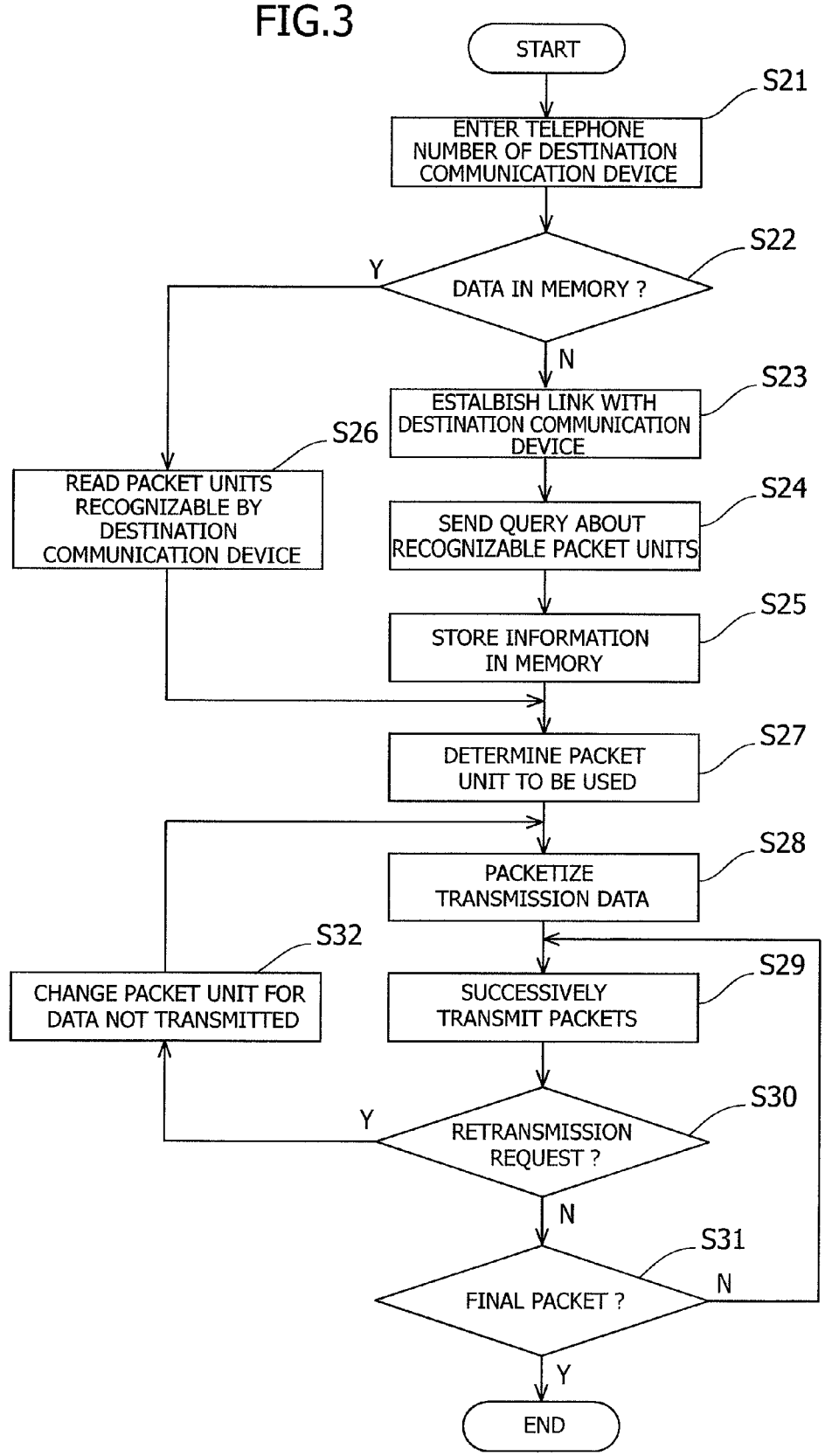

FIG.4

| |
|---|
| ID OF COMMUNICATION TERMINAL (TELEPHONE NUMBER) |
| ID OF COMMUNICATION TERMINAL TO BE BILLED (TELEPHONE NUMBER) |
| BILLING ACCOUNT NO. |
| DESTINATION ID (TELEPHONE NUMBER) |
| PACKET UNITS  NUMBER OF PACKETS  DATA COMMUNICATION RATES |
| 128 bytes   X PACKETS   X × ( UNIT PRICE OF PACKET ) |
| 384 bytes   Y PACKETS   Y × ( UNIT PRICE OF PACKET ) |
| DATE OF START OF TRANSMISSION     YYYY / MM / DD  \*\*/\*\* |
| DATA OF END OF TRANSMISSION     YYYY / MM / DD  \*\*/\*\* |
| COMMUNICATION TERMINAL LOCATION (GPS COORDINATES OR INFORMATION REQUIRED TO IDENTIFY LOCATION) |
| STATUS OF TRANSMISSION     GOOD |
| DESTINATION ID (TELEPHONE NUMBER) |
| PACKET UNITS  NUMBER OF PACKETS  DATA COMMUNICATION RATES |
| 768 bytes   Z PACKETS   Z × ( UNIT PRICE OF PACKET ) |
| DATE OF START OF TRANSMISSION     YYYY / MM / DD  \*\*/\*\* |
| DATA OF END OF TRANSMISSION     YYYY / MM / DD  \*\*/\*\* |
| COMMUNICATION TERMINAL LOCATION (GPS COORDINATES OR INFORMATION REQUIRED TO IDENTIFY LOCATION) |
| STATUS OF TRANSMISSION     GOOD |

COMMUNICATION TERMINAL DEVICE AND BILLING DEVICE

CROSS-REFERENCE TO RELATED APPLICATIONS

This application is a continuation of U.S. application Ser. No. 10/054,038, filed Nov. 12, 2001, incorporated herein by reference in its entirety, and claims the benefit of its earlier filing date under 35 U.S.C. 119(e).

BACKGROUND OF THE INVENTION

1. Field of the Invention

The present invention relates to a communication terminal device and a billing device in a packet communication system.

2. Description of the Related Art

Presently, it is customary for communications carriers which provide Internet connection services using portable telephone sets to charge users based on the number of packets of data that are transmitted and received. Each packet includes a header containing control information representative of a source, a destination, and a sequence of packets, etc. If the size of a packet, i.e., the amount of transmission data (hereinafter referred to as "packet unit") included in a packet is reduced, then the data transmitted and received per packet is relatively reduced, making the transmission and reception of data inefficient.

Conversely, if the size of a packet unit is increased, then even when a small amount of data is transmitted and received, the user is charged with a rate for the transmitted and received data based on the large packet unit.

SUMMARY OF THE INVENTION

It is therefore an object of the present invention to provide a communication terminal device and a billing device which can packetize transmission data with the most appropriate packet unit and transmit the packetized transmission data for effective use of communications circuits, so as to reduce data communication charges users have to pay.

In order to achieve the above object, there is provided in accordance with the present invention a communication terminal device comprising a packet unit determining unit for determining an appropriate packet unit for transmission data to be packetized, and a packet generator for packetizing the transmission data based on a packet unit determined by the packet unit determining unit.

The packet unit determining unit comprises means for determining the appropriate packet unit based on packet units that can be transmitted by the communication terminal device and packet units that can be recognized by a destination communication terminal device.

The communication terminal device further comprises at least one of means for transmitting a query about packet units that can be recognized by a destination communication terminal device to the destination communication terminal device, and means for responding to a query about packet units that can be transmitted by the communication terminal device from the destination communication terminal device.

The communication terminal device further comprises means for storing information with respect to the packet units that can be recognized by the destination communication terminal device.

The communication terminal device further comprises means for, if a retransmission request occurs while packets are being transmitted, transmitting data subsequent to the retransmission request according to a smaller packet unit.

According to the present invention, there is also provided a billing device comprising means for generating a billing file storing information for billing which includes the type of a transmitted packet unit, the number of transmitted packets, and a packet communication rate, with respect to an identification (ID) to be billed, and means for generating a charging file for the ID to be billed for a predetermined period.

BRIEF DESCRIPTION OF THE DRAWINGS

FIG. 3 is a flowchart of an operation sequence of the communication terminal device for transmitting packets; and FIG. 4 is a diagram showing, by way of example, a billing file used in the packet communication system.

DETAILED DESCRIPTION OF THE PREFERRED EMBODIMENT

A communication terminal device according to the present invention is applicable to both mobile communication systems and fixed communication systems. In the illustrated embodiment, the communication terminal device according to the present invention is shown as being applied to a mobile packet communication system.

Figure 1:
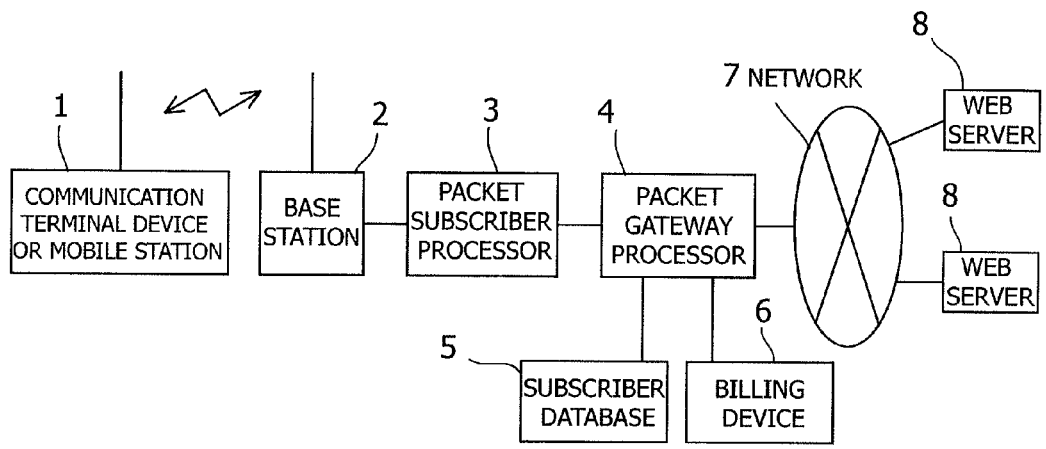
FIG. 1 is a block diagram of a packet communication system incorporating the principles of the present invention.

FIG. 1 shows in block diagram a packet communication system incorporating a communication terminal device and a billing device according to the present invention.

As shown in FIG. 1, the packet communication system includes a mobile communication terminal device 1, a base station 2 that can be connected to the communication terminal device 1, a packet subscriber processor 3 for controlling the transfer of user packets, managing the positions of mobile stations, and controlling an authentication process, a packet gateway processor 4 for connecting to a network such as the Internet and performing various processing sequences, a subscriber database 5 connected to the packet gateway processor 4, a billing device 6 connected to the packet gateway processor 4, a network 7 such as the Internet, and various servers 8 such as Web servers connected to the network 7.

The packet communication system thus constructed operates as follows: For transmitting data packets from the communication terminal device 1, the communication terminal device 1 attempts to register a packet communication process in the packet subscriber processor 3 via the base station 2. In response to a registration request from the communication terminal device 1, the packet subscriber processor 3 accesses the subscriber database 5 via the packet gateway processor 4, authenticates the user, and connects a link to the communication terminal device 1. The packet subscriber processor 3 then transmits a packet communication registration response to the communication terminal device 1, and transmits and receives packets.

When packets have arrived from the network 7, the packet gateway processor 4 acquires subscriber information and terminal location information of the communication terminal device 1 from the IP address of the received packets, and transfers the packets to the packet subscriber processor 3 of an area where the communication terminal device 1 is located. The packets are then transferred from the packet subscriber processor 3 via the base station 2 to the communication terminal device 1.

Figure 2:
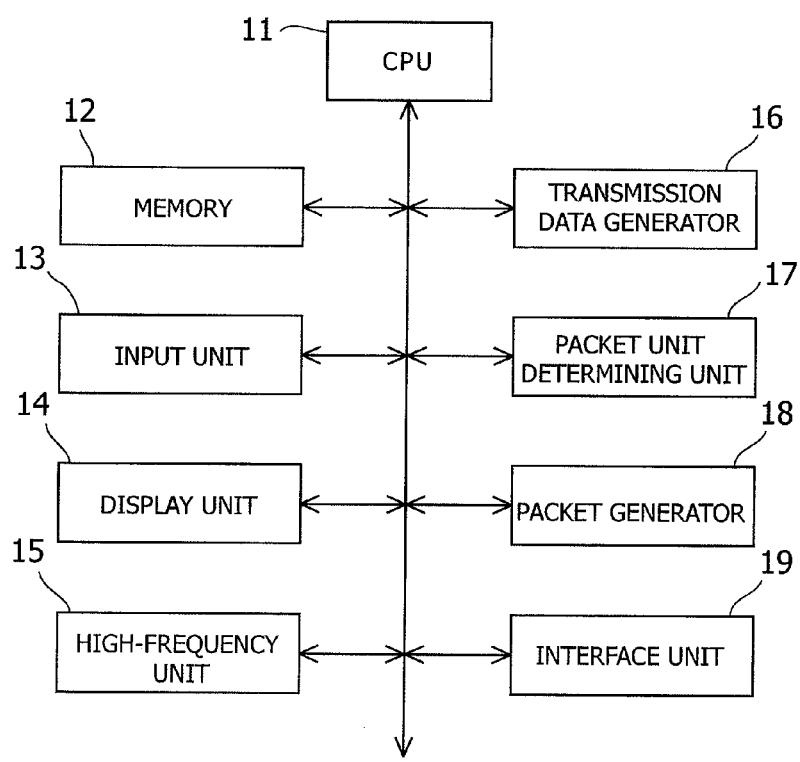
FIG. 2 is a block diagram of a communication terminal device according to the present invention.

According to the present invention, the communication terminal device 1 is arranged to be able to select and transmit a packet unit to be transmitted, i.e., an amount of transmission data per packet. FIG. 2 shows in block diagram the communication terminal device 1 according to the present invention.

As shown in FIG. 2, the communication terminal device 1 has a central processing unit (CPU) 11 for controlling overall operation of the communication terminal device 1, a memory 12 for storing a control program and various data, the memory 12 being also used as a working area, an input unit 13, a display unit 14, a high-frequency unit 15 for transmitting and receiving radio signals, a transmission data generator 16 for generating transmission data, a packet unit determining unit 17 for determining which packet unit is to be selected for transmitting packets, a packet generator 18 for generating a packet signal according to the packet unit determined by the packet unit determining unit 17, and an interface unit 19 for inputting data from and outputting data to an external device.

For transmitting packet data using the communication terminal device 1 thus constructed, the communication terminal device 1 is capable of selecting and transmitting a packet unit having an amount of data that is most appropriate for the data to be transmitted.

A process of selecting a packet unit will be described below with reference to FIG. 3. It is assumed that before this process is carried out, the user of the communication terminal device 1 has generated transmission data using the transmission data generator 16 based on data entered from the input unit 13 or data entered from the external device connected to the communication terminal device 1 via the interface unit 19.

For transmitting the data, the user enters the telephone number of a destination communication device in step S21. The destination communication device may be a portable communication terminal identical to the communication terminal device 1 or a fixed communication device.

Based on the entered telephone number, the CPU 11 determines whether information relative to packet units that can be recognized by the destination communication device is stored in the memory 12 or not in step S22. If not stored in the memory 12, then control goes to step S23 to establish a communication link between the communication terminal device 1 and the destination communication device. Then, the CPU 11 sends a query to the destination communication device about packet units that can be recognized by the destination communication device in step S24. The CPU 11 receives information about packet units that can be recognized by the destination communication device and stores the received information in the memory 12 in step S25. If information relative to packet units that can be recognized by the destination communication device is stored in the memory 12 in step S21, then control proceeds to step S26 in which the CPU 11 reads the information from the memory 12.

After the CPU 11 acquires the information about packet units that can be recognized by the destination communication device in step S24 or S26, control goes to step S27 in which the packet unit determining unit 17 determines a packet unit to be used for transmitting the transmission data. Specifically, the packet unit determining unit 17 selects packet units that can be transmitted by the communication terminal device 1 from those packet units that can be recognized by the destination communication device, and determines a packet unit among the selected packet units which reduces the amount of transmission data to a minimum level upon transmission of the transmission data, in view of data communication rates for the respective packet units. The packet unit determining unit 17 determines a packet unit based on an amount of actual transmission data exclusive of an amount of control data per packet. If a large packet unit is selected, then a communication error may occur depending on the communication circumstances, resulting in an increased charge for data communications. Depending on the communication speed, a large packet unit that is selected may cause a communication delay. Therefore, the status of received radio waves and the traffic congestion may also be used as a basis for determining a packet unit. The packet unit determining unit 17 may represent selectable packet units to the user, and the user may select a desired packet units from the selectable packet units.

After the packet unit determining unit 17 determines a packet unit optimum for the transmission data, control goes to step S28 in which the packet generator 18 packetizes the transmission data according to the determined packet unit. In step S29, the generated packets are successively transmitted from the communication terminal device 1 to the destination communication device. If the answer to step S22 is YES and the processing in step S26 is carried out, then a communication link to the destination communication device is established in step S29, and then the generated packets are successively transmitted from the communication terminal device 1 to the destination communication device. Thereafter, if a retransmission request due to a communication error does not occur (the answer to step S30 is NO) and the transmission data can be transmitted until the final packet (the answer to step S31 is YES), then the transmission of the transmission data is put to an end.

If a retransmission request due to a communication error occurs (the answer to step S30 is YES), then control goes to step S32 in which the packet unit determining unit 17 changes the packet unit to a smaller packet unit for use in the transmission of the transmission data. Thereafter, control goes back to step S28 in which the packet generator 18 packetizes the transmission data according to the smaller packet unit. Then, the generated packets are successively transmitted from the communication terminal device 1 to the destination communication device.

As described above, the communication terminal device according to the present invention determines an optimum packet unit among those packet units that can be recognized by both the user's communication terminal device and the destination communication terminal device and transmits the transmission data according to the determined packet unit. Therefore, the link established between the user's communication terminal device and the destination communication terminal device can effectively be utilized, and the burden on the user for data communication charges can be reduced.

Since the information about packet units that can be recognized by the destination communication terminal device is stored in the memory 12, it is possible to reduce the frequency of queries about packet units that can be recognized by the destination communication device.

When a retransmission request occurs, the presently determined packet unit is changed to a smaller packet unit, and the transmission data is transmitted according to the smaller packet unit. Accordingly, the burden on the overall packet communication system can be reduced.

A billing process carried out in the packet communication system which incorporates the above communication terminal device will be described below.

Packet units that can be transmitted and received are set in the billing device 6 which is connected to the packet gateway processor 4, and packet communication rates are established according to those packet units.

At present, 128 bytes are handled as one packet, and a packet communication rate per packet is 0.25 cents (0.3 yen).

According to the present invention, the following packet communication rates are established:

128 bytes/1 packet: 0.09 cents (0.1 yen)
    384 bytes/1 packet: 0.25 cents (0.3 yen)
    1280 bytes/1 packet: 0.9 cents (1 yen)

Based on the information from the packet gateway processor 4, the billing device 6 determines the packet unit of the packetized data transmitted from the communication terminal device 1 and calculates the number of packets of the packetized data, and generates a billing file.

FIG. 4 shows the billing file by way of example. As shown in FIG. 4, the billing file stores the ID of a communication terminal device, the ID of a communication terminal device to be billed, the ID of a destination communication terminal device in each packet transmitting process, information representing the types of packet units and the numbers of packets, a data communication rate produced by multiplying packet communication rates, the dates when the data transmission starts and ends, the location of the communication terminal device, and the status of transmission.

The billing device 6 defines a desired period, and generates a charging file for the ID of each communication terminal device to be billed from the charging file for the period.

The billing device 6 then transmits an e-mail message containing the charging file to the communication terminal device of the owner represented by the ID, or prints the charging file which will be sent by a postal service to the owner represented by the ID. At the same time, the billing device 6 withdraws a charged amount of money from a bank account that belongs to the ID of the communication terminal device to be billed.

By thus generating a billing file storing information necessary for billing, such as the number of packets for each packet unit and packet communication rates, it is possible to bill the user of a communication terminal device for packet communications using the communication terminal device.

In the above embodiment, the mobile communication terminal device has been described by way of example. However, the principles of the present are also applicable to a fixed communication terminal device.

As described above, the communication terminal device and the billing device according to the present invention allow the user to transmit and receive data according to an appropriate packet unit, and achieve data communications are carried out according to an appropriate packet unit for effectively utilizing limited frequency resources.

Since the communication terminal device according to the present invention is capable of storing packet units that can be recognized by the destination communication terminal device, the frequency of queries about packet units that can be recognized by the destination communication device is reduced, resulting in a reduction in the traffic.

In the event of the occurrence of a retransmission request, the communication terminal device according to the present invention changes the present packet unit to a smaller packet unit and transmits data according to the smaller packet unit. Therefore, the burden on the overall packet communication system can be reduced.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising:
   a billing record generating device configured to generate a billing record comprising billing information that includes a transmitted packet size, a number of transmitted packets, and a packet communication rate, with respect to an identification (ID) to be billed;
   a packet gateway processor configured to:
       determine the number of transmitted packets corresponding to an address of transmitted packets from a packet network;
       calculate the transmitted packet size for the transmitted packets;
       calculate the packet communication rate for the transmitted packets; and
       generate the billing information with respect to an ID to be billed based on the address of the transmitted packets; and
   a charging record generating device configured to generate a charging record for the ID to be billed for a predetermined period,
   wherein the billing record generating device is further configured to dynamically set:
       a range of packet sizes transferrable and receivable in subsequent communications based upon the calculated transmitted packet sizes; and
       packet communication rates corresponding to the range of packet sizes set by the billing record generating device.

2. The apparatus according to claim 1, wherein the packet communication rate comprises a cost per packet.

3. The apparatus according to claim 1, wherein the billing record generating device is further configured to generate the packet size of transmitted packets based on the billing information received from the packet gateway processor.

4. The apparatus according to claim 3, wherein the packet gateway processor is further configured to generate the billing information based on an Internet Protocol (IP) address of the received packets from the packet network, the billing information further including subscriber information and communication terminal device location information.

5. The apparatus according to claim 3, wherein the packet gateway processor is coupled to a subscriber database and the packet network to process the received packets from the packet network and provide subscriber information used to authenticate a user.

6. The apparatus according to claim 5, wherein the packet network comprises an Internet.

7. The apparatus according to claim 1, wherein the billing record generating device is further configured to generate the number of transmitted packets based on the number of transmitted packets determined by the packet gateway processor.

8. The apparatus according to claim 1, wherein the billing information further comprises an ID of a communication terminal device, an ID of a destination communication terminal device in each packet transmitting process, a data communication rate based on the packet communication rate, a starting date of data transmission, an ending date of data transmission, a location of a communication terminal device, or a status of transmission.

9. The apparatus according to claim 1, wherein the charging record generating device is further configured to withdraw a charged amount of money from a bank account associated with the ID to be billed.

10. The apparatus according to claim 1, wherein the charging record is transmitted through an e-mail message to a communications terminal device associated with the ID to be billed.

11. The apparatus according to claim 1, wherein the transmitted packet size comprises about 128 bytes/packet, 384 bytes/packet, or 1280 bytes/packet.

12. A computer-implemented method comprising:
generating, by a computing device, a billing record comprising billing information that includes a transmitted packet size, a number of transmitted packets, and a packet communication rate, with respect to an identification (ID) to be billed;
determining, by the computing device:
the number of transmitted packets corresponding to an address of transmitted packets from a packet network;
the transmitted packet size for the transmitted packets;
the packet communication rate for the transmitted packets; and
the billing information with respect to an ID to be billed based on the address of the transmitted packets;
generating, by the computing device, a charging record for the ID to be billed for a predetermined period; and
dynamically setting, by the computing device:
a range of packet sizes transferrable and receivable in subsequent communications based upon the calculated transmitted packet sizes; and
packet communication rates corresponding to the range of packet sizes set by the computing device.

13. An article of manufacture including a non-transitory computer-readable medium having instructions stored thereon, execution of which by a computing device cause the computing device to perform operations comprising:
generating a billing record comprising billing information that includes a transmitted packet size, a number of transmitted packets, and a packet communication rate, with respect to an identification (ID) to be billed;
determining the number of transmitted packets corresponding to an address of transmitted packets from a packet network;
calculating the transmitted packet size for the transmitted packets;
calculating the packet communication rate for the transmitted packets;
generating the billing information with respect to an ID to be billed based on the address of the transmitted packets;
generating a charging record for the ID to be billed for a predetermined period; and
dynamically setting:
a range of packet sizes transferrable and receivable in subsequent communications based upon the calculated transmitted packet sizes; and
packet communication rates corresponding to the range of packet sizes.

14. A billing device comprising:
a processor; and
a memory storing control logic comprising:
means for generating a billing record comprising billing information that includes a transmitted packet size, a number of transmitted packets, and a packet communication rate, with respect to an identification (ID) to be billed;
means for determining the number of transmitted packets corresponding to an address of transmitted packets from a packet network;
means for calculating the transmitted packet size for the transmitted packets;
means for calculating the packet communication rate for the transmitted packets;
means for generating the billing information with respect to an ID to be billed based on the address of the transmitted packets;
means for generating a charging record for the ID to be billed for a predetermined period; and
means for dynamically setting:
a range of packet sizes that can be transferred and received in subsequent communications based upon the calculated transmitted packet sizes; and
packet communication rates corresponding to the range of packet sizes.

* * * * *

UNITED STATES PATENT AND TRADEMARK OFFICE
CERTIFICATE OF CORRECTION

PATENT NO. : 7,869,430 B2  
APPLICATION NO. : 11/696498  
DATED : January 11, 2011  
INVENTOR(S) : Takatori et al.

Page 1 of 1

It is certified that error appears in the above-identified patent and that said Letters Patent is hereby corrected as shown below:

Page 2, item (56), under "Other Publications", in Column 2, Line 3, delete "Appl." and insert
-- Appl. No. --.

Signed and Sealed this
Thirty-first Day of May, 2011

David J. Kappos
*Director of the United States Patent and Trademark Office*